United States Patent
Symes (10) Patent No.: US 12,423,104 B2
(45) Date of Patent: Sep. 23, 2025

(54) CLIPPING OPERATIONS USING PARTIAL CLIP INSTRUCTIONS

(71) Applicant: Arm Limited, Cambridge (GB)

(72) Inventor: Dominic Hugo Symes, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/777,537

(22) Filed: Jul. 18, 2024

(65) Prior Publication Data
US 2025/0036410 A1    Jan. 30, 2025

(30) Foreign Application Priority Data
Jul. 26, 2023 (GB) ...................................... 2311477

(51) Int. Cl.
*G06F 9/30* (2018.01)

(52) U.S. Cl.
CPC ................................ *G06F 9/30152* (2013.01)

(58) Field of Classification Search
CPC ............. G06F 9/30021; G06F 9/30032; G06F 9/30167
See application file for complete search history.

(56) References Cited

U.S. PATENT DOCUMENTS

| | | | | |
|---|---|---|---|---|
| 6,009,512 A * | 12/1999 | Christie | ................ | G06F 9/3842 |
| | | | | 712/E9.05 |
| 6,504,495 B1 | 1/2003 | Symes et al. | | |
| 8,804,850 B1 * | 8/2014 | Khan | ..................... | H04N 19/86 |
| | | | | 375/240.29 |
| 2002/0065860 A1 * | 5/2002 | Grisenthwaite | ..... | G06F 9/30038 |
| | | | | 708/207 |
| 2005/0027774 A1 * | 2/2005 | Chauvel | ................ | G06F 9/3879 |
| | | | | 708/552 |
| 2006/0095713 A1 * | 5/2006 | Boggs | ................. | G06F 9/30036 |
| | | | | 712/E9.02 |
| 2006/0095714 A1 * | 5/2006 | Boggs | .................. | G06F 9/3001 |
| | | | | 712/E9.02 |
| 2023/0004393 A1 * | 1/2023 | Madduri | ............. | G06F 9/30149 |
| 2023/0048836 A1 * | 2/2023 | Itani | .................... | G06F 9/30072 |

OTHER PUBLICATIONS

UKIPO Search Report dated Feb. 22, 2024 for UK Application No. GB2311477.0.

* cited by examiner

*Primary Examiner* — Jacob Petranek
(74) *Attorney, Agent, or Firm* — EIP US LLP (57) ABSTRACT

Methods and apparatus for performing a clipping operation comprised of a plurality of partial clip instructions based on a portion of a clip value. Wherein the partial clip instructions comprise decoding (120) a partial clip instruction using instruction decoding circuitry, and obtaining (110) at least a portion of input data associated with a register having a register size. In response to the decoded instruction the portion of the input data is clipped (130) based on the portion of the clip value; and a flag is set (140) indicating whether further clipping is required. The flag is set when an upper value of the portion of input data is equal to or exceeds the portion of the clip value.

20 Claims, 5 Drawing Sheets

CLIPPING OPERATIONS USING PARTIAL CLIP INSTRUCTIONS

TECHNICAL FIELD

The present invention relates to data processing instructions for the clipping of boundary ranges of storage to clip limit, in particular when the processing circuitry is configured to operate on constants with a given constant size.

BACKGROUND

Certain data processing techniques, such as neural network processing and graphics processing, involve the processing and generation of considerable amounts of data using operations. It is desirable to efficiently handle the data when processing by instructions.

SUMMARY

According to aspects of the present disclosure, there are provided methods, a computer program product such as a non-transitory computer-readable storage medium, and computer programs for controlling a host data processing apparatus, and apparatus configured to perform the methods.

A first method is one of performing a partial clip instruction with a portion of a clip value, the method comprising obtaining at least a portion of input data, the portion of input data being associated with a register having a register size; decoding the partial clip instruction using instruction decoding circuitry; and in response to the decoded instruction, clipping the portion of the input data based on the portion of the clip value; and setting a flag indicating further clipping is required when an upper value of the portion of input data is equal to or exceeds the portion of the clip value.

By performing clipping instructions on portions of input data, and setting a flag to indicate whether further clipping is required, instructions may be concatenated into operations such that a program supports a wide range of input data sizes. This is particularly useful for machine learning implementations where the size of the tensors used will often exceed the size of the clip parameter. This also enables the processing of input data that has a size which exceeds the size that the data processing hardware is capable of processing. This, therefore, enables the processing of input data with a larger input data size, whilst minimizing the hardware required thereby reducing the overall on-chip space required for the implementation of the method. This reduces the cost, manufacturing complexity, and processing power requirements needed to implement the method.

Optionally, an input portion number associated with the portion of input data is decoded to determine a selected input portion and a selected clip portion associated with the clip value. This enables the tracking of clip portions and associated portions of input data to ensure the accurate generation of a clip value when performing a larger clip operation.

The flag value may be read and used to determine whether to clip the portion of the input data based on the flag value. By using the flag value to indicate whether further clipping is required, more efficient clipping operations can be undertaken such that clipping is not applied if a higher portion comparison has already determined that the value need not be clipped further. Similarly, clipping the portion of the input data may comprise determining whether the portion of the input data is greater than the portion of the clip value. Both of these features ensure the efficient use of resources such that unnecessary clipping operations are not being performed.

The portion of the clip value may be an 8-bit shifted constant, this enables hardware capable of processing 8-bit values to be used, thereby reducing manufacturing costs and resource requirements, whilst still providing efficient processing capabilities.

Optionally, the register comprises at least a low bound component and a high bound component, and the flag is stored in the low bound component. The flag may be stored in a sign bit associated with the low bound of the register. The clipping may be applied to a high bound of the register only. By splitting the register into high bound and low bound components, the efficient clipping of the input data may be achieved. Furthermore, storing the flag in the sign bit of the low bound of the register enables the flag to be stored without additional hardware since the low bound of the register will always be greater than or equal to zero.

Performing subsequent partial clip instructions may be based on the setting of the flag, and at least one of the subsequent partial clip instructions of the plurality of partial clip instructions may comprise reading the flag. This enables the efficient determination of the clipped input data since only those values which require clipping are clipped based on the flag.

A second method is one of compiling a sequence of instructions comprising a plurality of partial clip instructions, such as the partial clip instructions described above in relation to the first method, wherein the sequence length is determined based on a range of potential input values. This enables the efficient generation of clipped input data where the hardware configured to clip the input data is configured to operate on data having a smaller data size.

Further features and advantages of the invention will become apparent from the following description of preferred embodiments of the invention, given by way of example only, which is made with reference to the accompanying drawings.

DETAILED DESCRIPTION

In general computing, computer programmes are often configured to operate on data stored in registers associated with the processor upon which the computer programme is operating.

As part of the computer programme a number of instructions may be issued, such that the processor is configured to operate on one or more values stored in a register. The size of the value stored in the register may be dependent on a number of hardware limitations, including but not limited to the register size. For example, in some examples, the values stored in the register may be limited to signed 32-bit, in yet other examples the register has high and low component values, each of which may store a signed 32-bit value. One of the instructions of the computer programme may be a clip instruction which is used to clip register values such that the clip instruction is used to specify a boundary range. Examples of other instructions may also be used, such as a multiply with right shift instruction as will be described in further detail below.

Clipping Operation Using Partial Clip Instructions

As described briefly above, registers may be used to temporarily store one or more values for subsequent processing. The data provided as an input to may have a data size exceeding the size that the data processing hardware is capable of processing. As such, it may be necessary to select a portion of the input data for processing. Furthermore, this limits the space for program instructions, such that each instruction may be represented by a single byte of data capable of taking a single 8-bit parameter. In such an example, if the input data exceeds the 8-bit size required by the instruction, it may be necessary to divide to input data into portions for comparison. It will be appreciated that the input data may be of another size, such as 16-bit or 32-bit. By diving the input data into portions for comparison, instructions may be concatenated into operations such that a program supports a wide range of input data sizes. This is particularly useful for machine learning implementations where the size of the tensors used will often exceed the range of the instruction parameter.

Figure 1:
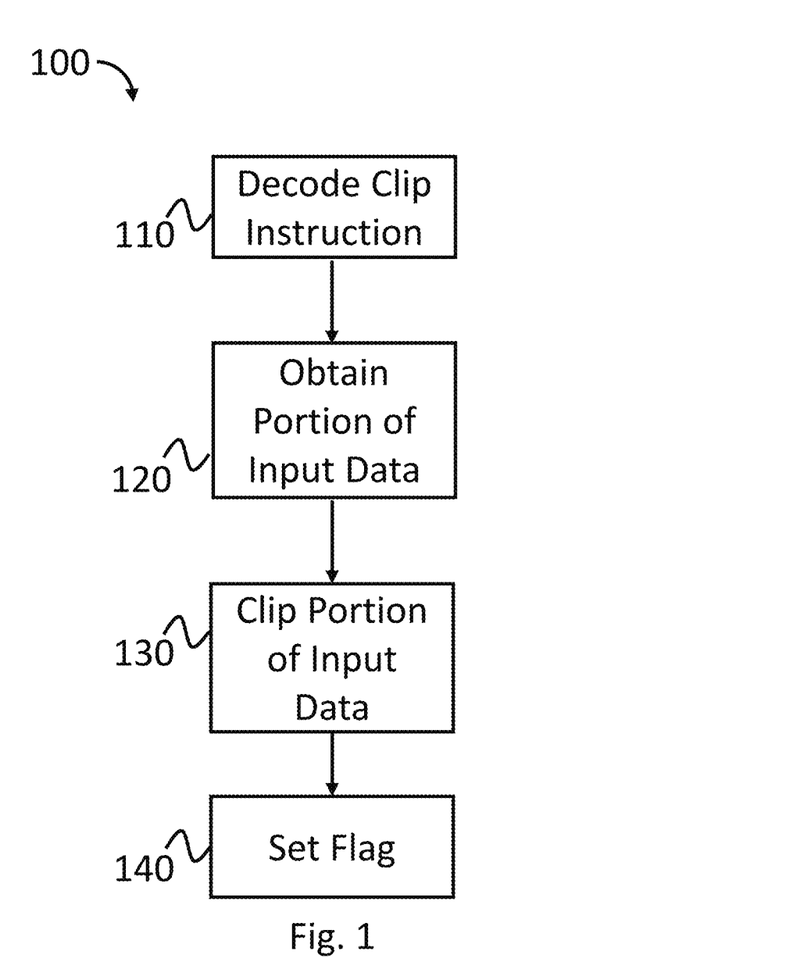
FIG. 1 is a flowchart showing a method for performing partial clip instruction, according to an example.

FIG. 1 is a flowchart 100 showing a method for performing a partial clip instruction. At step 110 a partial clip instruction is received and decoded by the data processing hardware. In particular, the partial clip instruction may be decoded by instruction decoding circuitry associated with the data processing hardware. The instruction decoding circuitry supports a plurality of different instructions, including the partial clip instruction which performs a computation operation to clip input data (or portions thereof) to a given boundary register based on a low (b.lo) and high (b.hi) signed component of the boundary register, thereby representing the range of the boundary register. The range may therefore be represented as a range of [0, m], where m is a non-negative signed 32-bit value. It will be appreciated that other sizes of 'm' may be used depending on the hardware capabilities (e.g., a 16-bit or a 32-bit size). When clipping to the low and high signed components of the boundary register, the clip values may be represented as:

$$b.lo = \max(b.lo, 0)$$
$$b.hi = \min(b.hi, m)$$

Equations 1 and 2

Once the partial clip instruction has been decoded, at step 120, at least a portion of input data is obtained. For example, the input data may be tensor coordinates or dimensions for use as part of a machine learning program or maybe any other suitable data. In some examples, the input data will have a size which exceeds the size that the data processing hardware is capable of processing, such as the data processing hardware described below with reference to FIGS. 6 to 8. In such examples, it is necessary to divide the input data into portions such that the data processing hardware is capable of operating on the input data portion.

As described above, in some examples, the input data may be tensor coordinates or sizes for use in a machine-learning program stored in a boundary register or boundary registers, which have a high signed 32-bit component which represents the range of values of the input data/tensor. This range of values may exceed the processing capabilities of the hardware, which in some examples may be configured to operate on shifted 8-bit constants. It will be appreciated that in other examples, the size of the boundary registers and the size of the constants which the hardware is configured to operate on may be different (e.g., 32-bit boundary registers and 16-bit constants; or 64-bit boundary registers and 8-bit constants; other examples will be apparent to the skilled person).

At step 120, where the size of the input data exceeds the size of the immediate or a constant, such as an 8-bit constant, at least a portion of the input data may be obtained. The input data may be split into a plurality of portions and may each be allocated an associated portion number, which corresponds to a portion number associated with the clip value.

In response to the decoding of the partial clip instruction, at step 130 the portion of the input data is clipped based on the low and high signed components of the boundary register. As the data processing hardware is only able to operate on data with a size smaller than the input data, as mentioned above, it is necessary to split the input data into a plurality of portions such that the input portion size is sufficient for processing by the data processing hardware. For example, the data processing hardware may be configured to operate only on shifted 8-bit constants, and thus the upper value of the range (m) may be represented by four different bytes, namely:

$$m = (m3 << 24) + (m2 << 16) + (m1 << 8) + m0 \qquad \text{Equation 3}$$

Each of these portions of the range may be used to operate on the portions of the input data such that the input data can be clipped to the relevant range required for the boundary register (i.e., the range of b.lo and b.hi). As each of the operations undertaken on the separate portions are dependent on each other, it is possible to obtain further efficiencies by determining whether it is necessary to perform further clip operations, especially when performed on the high bound of the boundary register (b.hi). For example, if the top byte of the input data is less than m3 then no further clipping is required on a subsequent portion for the higher range, similarly if the top byte of the input data is greater than m3, then a subsequent portion of the input data must be set to m2, and if the top byte of the input data is equal to m3 then further clipping to subsequent portions of the input data will be required. Examples of this process will be described in further detail below. To indicate whether further clipping is or is not required, at step 140, a flag may be set. Since b.lo is always non-negative (i.e., greater than or equal to 0) after clipping, the sign bit of b.lo is available to indicate whether further clipping is required. Therefore, the signed bit of b.lo may be set as 1 to indicate further clipping is required and as 0 to indicate no further clipping is required. It will be appreciated that there are other methods and available bits which may be used when setting the flag.

Figure 2:
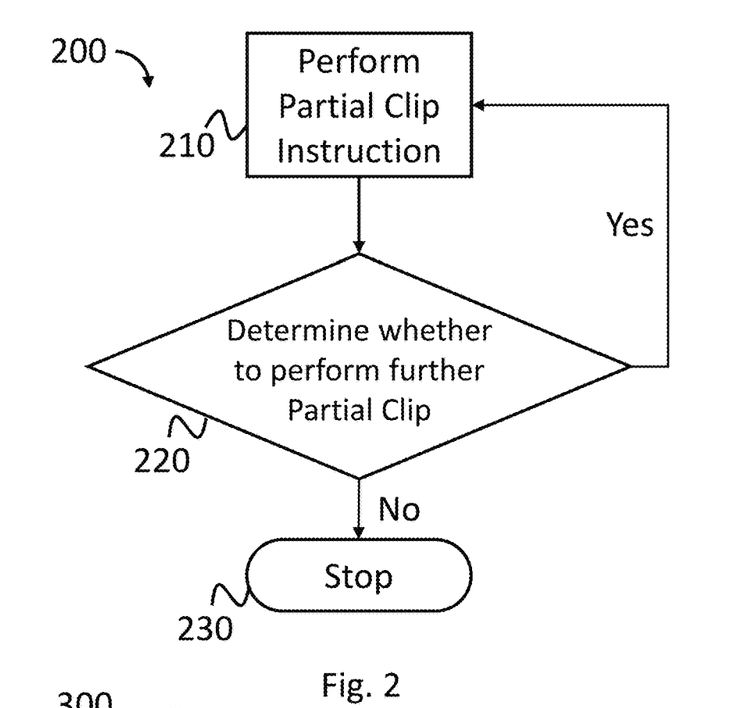
FIG. 2 is a flowchart showing a method for performing a clipping operation, according to an example.

FIG. 2 is a flowchart 200 showing a method for performing a clipping operation. At step 210 a partial clip instruction is performed. The partial clip instruction, such as the partial clip instruction described in relation to method 100 of FIG. 1 may be performed, and the flag set as described above. Following the performance of the partial clip instruction, at step 220 it is determined whether to perform a further partial clip instruction. In some examples, determining whether to perform a further partial may be based on the flag set in step 140 of method 100. The flag value may be read before the performing of a subsequent partial clip instruction, such that if the flag value indicates that further clipping is required, then further partial clip instructions may be performed. This may be determined by reading the status of the flag (e.g., the sign bit of the low bound of the boundary register, b.lo). In other examples, such as when the input data is of a known size, the highest portion to start clipping may be determined at a compile stage.

The partial clip instruction described in relation to method 100 may be performed on only a portion of the input data. In such an example, the portion of the input data may be allocated an input portion number and an associated portion of the clip value (i.e., with a corresponding clip portion number) may be selected. For example, the portion of the clip value may be an 8-bit shifted constant, such that the hardware performing the partial clip instruction can be simplified and memory/processing requirements reduced. Further efficiencies may be obtained by pre-compiling a clipping operation such that the compiled clipping operation comprises a sequence of partial clip instructions, and the length of the sequence is based on the range of potential input values. The compiled clipping operations may comprise a plurality of partial clip instructions, such that the first partial clip instruction does not require the data associated with the flag (e.g., the sign bit of b.lo), but subsequent partial clip instructions do require data to be present representing the flag.

An example of a compiled clipping operation is set out in the below pseudocode which represents the method set out above, namely that if the higher byte (b.hi) is greater than or equal to the corresponding constant byte (m) then the sign byte of the lower limit (b.lo) is used to signal that further clipping is needed on the lower bytes. As described above as b.lo is clipped to a non-negative number by a first clip instruction, the sign bit is free to hold the flag. If the higher byte is greater than the corresponding m byte then the lower bytes of the register may be set to a maximum value (e.g., 0xFF where the portion size is 8-bits). This ensures that when the lower bytes are clipped, they take the values which are the lower bytes of m. The clipping operation is then performed as a sequence, where a first in the sequence (CLP) does not consider the value set as a flag, and subsequent partial clip operations (CLP.L) consider the flag when clipping the lower bytes. If the value to be clipped is known to have a smaller range (e.g., 3 bytes vs 4 bytes) then fewer clip instructions can be used as the first clip value can be the highest byte with a non-zero value (see below in relation to Example 4). This methodology is shown in the following worked examples, which comprise a 32-bit clip value and four instructions A, B, C, D:

A. CLP ((m>>24) & 0xFF), 3
B. CLP.L ((m>16) & 0xFF), 2
C. CLP.L ((m>>8) & 0xFF), 1
D. CLP.L ((m>0) & 0xFF), 0

Example 1

$$b.lo = -0 \times 0000100$$
$$b.hi = 0 \times 12345678$$
$$m = 0 \times 0.189ABCD$$

After A.: b.lo=0x80000000 b.hi=0x01FFFFFF // this is the greater than case described above
After B.: b.lo=0x80000000 b.hi=0x0189FFFF // since b[31]—('8' in b.lo)—signals further clipping is needed
After C.: b.lo=0x80000000 b.hi=0x0189ABFF // since b[31] signals further clipping is needed
After D.: b.lo=0x00000000 b.hi=0x0189ABCD // since b[31] has been cleared as this is the last byte Example 2

$$b.lo = -0 \times 0000100$$
$$b.hi = 0 \times 12345678$$
$$m = 0 \times 1234AB00$$

After A.: b.lo=0x80000000 b.hi=0x12345678 // this is the greater than or equal case described above
After B.: b.lo=0x80000000 b.hi=0x12345678 // since b[31]—('8' in b.lo)—signals further clipping is needed—this is still the greater than or equal case
After C.: b.lo=0x80000000 b.hi=0x12345678 // b[31] is cleared as the corresponding byte of b.hi ('56') is less than the corresponding byte of m ('AB')
After D.: b.lo=0x00000000 b.hi=0x12345678 // no clipping of the last byte is required since b[31] has been cleared Example 3

$$b.lo = -0 \times 00000200$$
$$b.hi = 0 \times 12345678$$
$$m = 0 \times 20000000$$

After A.: b.lo=0x00000200 b.hi=0x12345678 // this is the less than case described above
After B.: b.lo=0x00000200 b.hi=0x12345678 // no further clipping is needed
After C.: b.lo=0x00000200 b.hi=0x12345678 no further clipping is needed
After D.: b.lo=0x00000200 b.hi=0x12345678 // no further clipping is needed As set out above, the compiler can select fewer clip instructions. In that case, if the input data range is known to be 16-bit then only two clip instructions are required. This methodology is shown in the following worked example, which comprises a 16-bit clip value and two instructions E, F:

E. CLP ((m>>8) & 0xFF), 1
F. CLP. L ((m>>0) & 0xFF), 0

Example 4 b.lo = 0×00000300 b.hi = 0×00001234 m = 0×00000567

Figure 3:
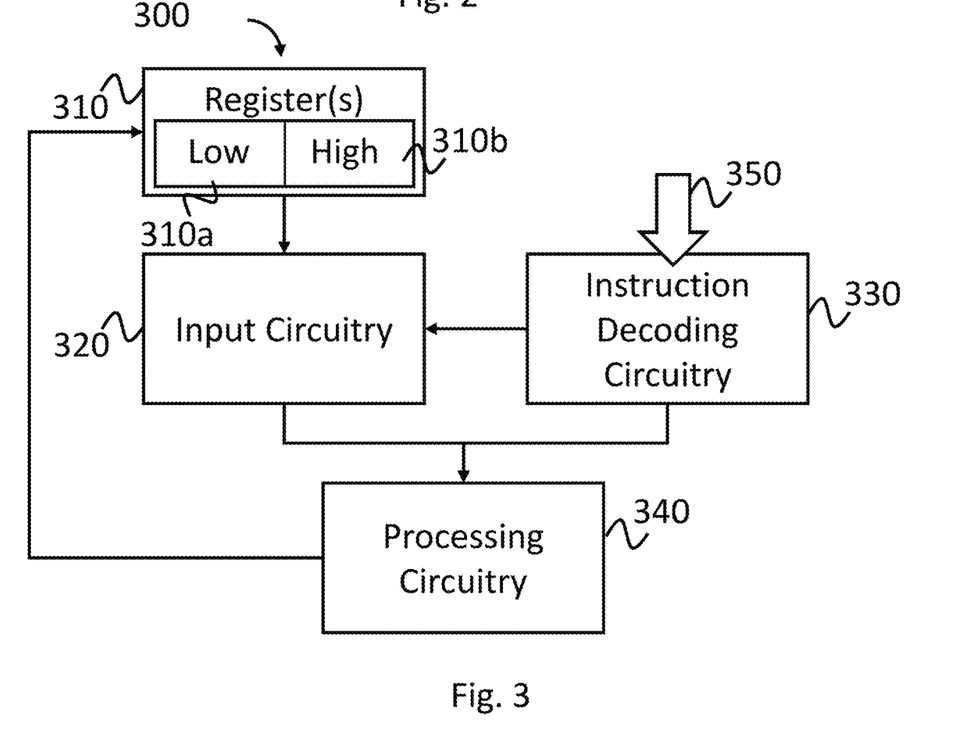
FIG. 3 is a schematic representation of an apparatus, according to an example.

After E: b.lo=0x80000000 b.hi=0x000005FF // this is the greater than case described above, so set b[31] of b.lo and make lower byte FF After F: b.lo=0x00000300 b.hi=0x00000567 // last byte clipped and b[31] of b.lo is cleared FIG. 3 is a schematic representation of an apparatus 300 for performing a clip operation based on partial clip instructions as described above in relation to methods 100, 200 of FIGS. 1 and 2. The apparatus 300 has input circuitry 320 configured to obtain at least a portion of input data, the portion of input data being associated with a register 310 having a given register size. The register 310 may be the boundary register described above in relation to FIGS. 1 and 2 and comprise a high portion 310a (b.hi) and a low portion 310b (b.lo). The apparatus may also comprise a storage medium (not shown), such as a solid-state drive (SSD) or other semiconductor-based RAM; a ROM, for example, a CD ROM or a semiconductor ROM; a magnetic recording medium, for example, a floppy disk or hard disk; optical memory devices in general; etc. In some examples, the register may form part of this storage medium.

The apparatus further comprises instruction decoding circuitry 330, configured to receive an instruction 350. The instruction decoding circuitry 330 may be configured to receive any number of instructions not just partial clip instructions and/or clipping operations. For example, the instruction decoding circuitry 330 may be configured to receive a multiply with right shift instruction as described in further detail below. The instruction decoding circuitry 330 receives the instruction and subsequently decodes it for processing by the processing circuitry 340. The processing circuitry 340 may be configured to perform any number of tasks, and in particular, configured to perform at least the partial clipping instructions. The processing circuitry 340 is configured to clip a portion of the input data stored in the register based on a corresponding portion of the clip value as described above in relation to method 100 of FIG. 1. The processing circuitry is also configured to set a flag to indicate whether further clipping is required. The flag may be the sign bit of the low portion 310b (b.lo) of the register since the range's lower bound is always clipped to the higher of the low bound or zero (i.e., it will always be a non-negative number).

The processing circuitry 330 may also be configured to decode the input portion based on an input portion number associated with a portion of the input data and a corresponding clip portion number associated with the selected and corresponding portion of the clip value. By decoding the input data by portions, it can be determined whether to clip the portion of input data based on whether the particular portion of input data is greater than the portion of the clip value. This can then provide information as to whether further clipping is likely to be required.

As described above, the clip value may be an 8-bit shifted constant, however, it will be appreciated that other sizes of clip values may be used depending on the processing circuitry's 330 hardware. For example, the processing circuitry 330 may be configured to operate on 16-bit constants or 32-bit constants.

In addition to performing partial clip instructions, the apparatus 300 may be configured to perform a plurality of partial clip instructions compiled as a clipping operation. By performing a plurality of partial clip instructions, the apparatus 300 is able to clip values larger than the hardware configuration initially permits. This is achieved as described above by the setting of a flag to indicate whether further clipping is or is not required.

Flooring Divide Operation Using Multiply with Right Shift Instructions

The implementation of a flooring divide operation may be based on the use of multiplication instructions as will be described in further detail below. For example, performing a flooring divide of a signed-32-bit value by a positive 32-bit divisor may be achieved using 32×8 multipliers. Performing such calculations may be more hardware/processor efficient than other methods as it can leverage hardware-efficient implementations such as right shifting, as well as minimizing the need for more complex hardware.

Hardware may be limited in the performance of calculations based on their processor capabilities and other hardware constraints such as the size of registers and/or other constraints. For example, processor and/or memory constraints may limit any calculation to 8-bit inputs, however, it will be appreciated that other data lengths may be used such as 16-bits and 32-bits. In such an example, hardware may be capable of multiplying 32-bit integers by 8-bit constants, by utilizing this hardware functionality, a series of multiplication instructions with right shifts may be used to implement a division operation. That is a compiler may be capable of implementing a flooring divide using multiplication with right shift instructions such as (n×m)>>shift for positive values or for negative values rounding towards minus infinity. This enables the use of processing circuitry which is configured to operate on constants smaller than the size capable of being stored as a constant.

Figure 4:
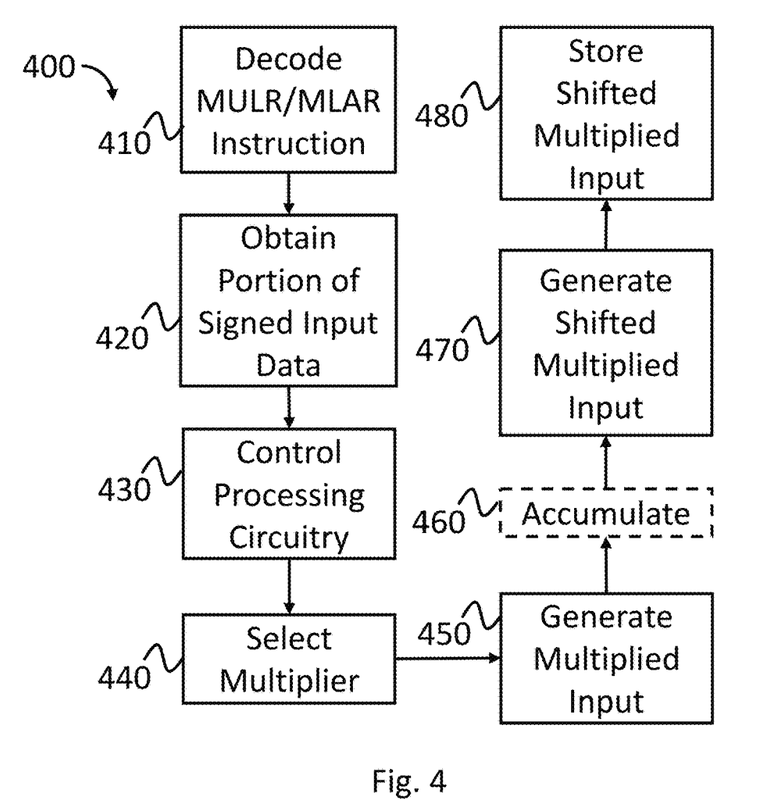
FIG. 4 is a flowchart showing a method for performing multiply with right shift, and/or multiply-accumulate with right shift instructions, according to an example.

FIG. 4 is a flowchart 400 showing a method for performing a multiply with right shift instruction ('MULR'), such as the one described above for using a flooring divide operation. At step 410 a multiply with right shift instruction (MULR) and/or a multiply-accumulate with right shift instruction (MLAR) is received and decoded by the data processing hardware. In particular, these instructions may be decoded by instruction decoding circuitry associated with the data processing hardware. The instruction decoding circuitry supports a plurality of different instructions, including these instructions that perform a computation to generate shifted multiplied input data based on the at least one portion of the input data.

In some examples, the multiply with right shift instruction may comprise accumulating the multiplied input data with previously shifted input data. In such examples, this instruction may be referred to as a multiply-accumulate with right shift instruction ('MLAR').

Once the instruction has been decoded, at step 420, at least a portion of signed input data is obtained. The portion of signed input data is associated with a register having a given register size for example, the input data may be a tensor coordinate or tensor size for use as part of a machine learning program or may be any other suitable data. The input data has a size which exceeds the size that the data processing hardware is capable of processing, such as the data processing hardware described below with reference to FIGS. 6 to 8.

As described above, in some examples, the input data may be a tensor coordinate or dimension for use in a machine-learning program stored in a boundary register or boundary registers, which have a signed 32-bit component which represents the range of values of the input data/tensor. This range of values may exceed the processing capabilities of the hardware, which in some examples may be configured to operate on 8-bit constants. It will be appreciated that in other examples, the size of the boundary registers and the size of the constants which the hardware is configured to operate on may be different (e.g., 32-bit boundary registers and 16-bit constants; or 64-bit boundary registers and 8-bit constants; other examples will be apparent to the skilled person).

In some examples, where the size of the input data exceeds the processing capabilities of the hardware, at least a portion of the input data may be obtained. The input data may be split into a plurality of portions and may each be allocated an associated portion number.

In response to the decoding of the instructions and receipt of the portion of signed input data, at step 430 processing circuitry, such as the data processing hardware described above is controlled to perform data processing on the portion of signed input data. The processing circuitry is configured to operate on constants smaller than the register which is used to store the at least one portion of input data.

At step 440, a multiplier is selected based on a sign associated with the signed input data. For example, where the sign is negative, a first-derived constant is selected as the multiplier, and where the sign is positive a second-derived constant is selected as the multiplier. The derived constants may be based on the constant size the processing circuitry is configured to operate on. In some examples, the first derived constant is equal to the constant the processing circuitry is configured to operate on minus one, and the second derived constant is equal to the constant itself. In other examples, the first derived constant may be equal to the constant minus 1 modulo the constant size.

The selection of the constant, as described previously, may be based on the capabilities of the processing circuitry. For example, the constant may be based on the size of constants the processing circuitry is capable of operating on, such as an 8-bit constant, a 16-bit constant, or a 32-bit constant. It will be appreciated that other size constants may also be used and that the processing circuitry may be capable of operations on constants of these other sizes. The constant selected may be derived from one or more inputs to other operations, such as the floored divide operation described in further detail below. In such an example, the constant may be derived based on:

$$\lfloor \text{constant} \rfloor = \frac{(1 << (\text{register size} + \text{divisor size})) + \text{divisor}}{\text{divisor}} \quad \text{Equation 4}$$

Where the divisor and the divisor size relate to the divisor in the floored divide operation.

In some examples, the constant is smaller than a size of the signed input data, and in other examples, as mentioned above the constant may be limited based on the processing capabilities of the processing circuitry, such as having a size of 8-bits.

Once the multiplier has been selected, at step 450, a multiplied input is generated. The multiplied input is generated using the portion of signed input data and the multiplier. The multiplied input may be generated using the processing circuitry, which may comprise hardware configured to efficiently perform multiplication operations between inputs having the constant size and/or input data portion size. In some examples, such as multiply-accumulate with right shift instructions, there is an optional accumulation step 460, where the results of previous instructions are accumulated before generating the shifted multiplied input at step 470 described below. Following the generation of the multiplied input and the optional accumulation, at step 470, shifted multiplied input data is generated by shifting the input by the constant size. As with steps 450 and 460, the shifting operation undertaken at step 470 may also be generated using the processing circuitry, which may also comprise hardware configured to efficiently perform the shifting operations.

Following the generation of the shifted multiplied input data, at step 480, the shifted multiplied input data is stored in storage. The storage may form part of an apparatus configured to perform the multiply with right shift operation, and/or may be separate from it. The storage may be a solid-state drive (SSD) or other semiconductor-based RAM; a ROM, for example, a CD ROM or a semiconductor ROM; a magnetic recording medium, for example, a floppy disk or hard disk; optical memory devices in general; etc. In some examples, a register may form part of this storage.

A flooring divide operation may comprise a plurality of multiply with right shift and/or multiply-accumulate with right shift instructions, such as the instructions described above in relation to FIG. 4. The flooring divide operation may also comprise one or more multiply-accumulate with right shift instructions. Determining the requirements of the flooring divide operation comprises compiling a sequence of these instructions, wherein the sequence of instructions comprises at least one of the multiply with right shift instructions described above. The flooring divide operation may be undertaken on hardware such as that described below with reference to FIGS. 6-8. The flooring divide operation may comprise a plurality of instructions configured to perform at least one of the following:

$$\left\lfloor \frac{n}{d} \right\rfloor = (n \times m) >> (N + k) \quad \text{Equation 5}$$

where $$n \geq 0 \, (MULR)$$

$$\left\lfloor \frac{n}{d} \right\rfloor = (n \times (m - 1)) >> (N + k) \quad \text{Equation 6}$$

where $$n < 0 \, (MULR.C)$$

where n is the at least one portion of signed input data, d is the positive divisor, m is the multiplier constant selected based on the constant of a given constant size, N is the number of bits in n such that $-(1<<N) \leq n < (1<<N)$, and k is the number of bits in d such that $(1<<(k-1)) < d \leq (1<<k)$. The constant, m, is then calculated as:

$$m = \left\lfloor \frac{(1 << (N + k)) + d}{d} \right\rfloor \quad \text{Equation 7}$$

Following Equations 5 and 6 above, the flooring divide operation may comprise a plurality of instances of the multiply with right shift and multiply-accumulate with right shift instructions described above in relation to FIG. 4. Worked examples of such operations will be provided below.

In some examples, the multiplier may be split into a plurality of portions based on the given constant size, such as when the processing circuitry is configured to operate on constants smaller than the size of the multiplier. The multiply with right shift instruction may be used in the flooring divide operation when the constant and the result of the constant minus one differs for a particular portion of the signed input data.

Examples of compiled flooring divide operations are set out in the below pseudocode which represents the methods set out above. Namely, the use of multiply with right shift (MULR) and multiply accumulate with right shift (MLAR) operations based on known a divisor (and associated divisor size), an input data size, a portion of input data represented as an integer, and a known multiplier.

Example 1

$N$ (number of bits in $n$) = 31

$m$ (multiplier) = $0 \times 12345600$ $(m-1) = 0 \times 123455FF$ $k$ (size of the divisor) = 5 where the processing circuitry is configured to operate on 8-bit constants, the 32-bit multiplier will be divided in to 4×8 bits portions each to operate on a given portion of the input data n. Therefore, a flooring divide operation in this example, based on Equation 5 and 6 above, is represented as:

if $(n \geq 0)$: $\frac{n}{d} = (n \times 0 \times 12345600) >> 36$ if $(n < 0)$: $\frac{n}{d} = (n \times 0 \times 123455FF) >> 36$ In this example, m is not derived from a divisor, d, value but illustrates how an example m value is partitioned.

A sequence of instructions is compiled based on each of the 8-bit constants associated with the multiplier. Where the 8-bit constants of the multiplier differ then MULR.C/MLAR.C (equation 6) is used, whereas if the 8-bit constants are the same then MULR/MLAR is used. Therefore, in this example the sequence of instructions would be:

0: MULR.C #0x00 (0x00 are the lowest bytes of m)
1: MLAR.C #0x56
2: MLAR #0x34
3: MLAR #0x12
4: ASR #4

In the above instruction sequence representative of a flooring divide operation, since the two lowest set of bytes of m and (m−1) differ, the MULR.C/MLAR.C instructions are utilized for instructions [0] and [1]. Furthermore, since N+k=36, the MULR/MLAR instructions only shift the bits by 32 bits, and therefore an additional 4 bit shift is required, hence the use of ASR #4 instruction.

As described above, the use of MULR and MLAR are based on whether an accumulation is required. In this example, a first MULR instruction is performed, and then subsequent MLAR instructions are performed which accumulate the result of the previous MULR or MLAR instructions, before performing a final shift operation.

Example 2

$N$ (number of bits in $n$) = 31

$m$ (multiplier) = $0 \times aaaaaaab$ $(m-1) = 0 \times aaaaaaaa$ $k$ (size of the divisor) = 2

$d$ (divisor) = 3

A flooring divide operation in this example, based on Equation 5 and 6 above, is represented as:

if $(n \geq 0)$: $\frac{n}{d} = (n \times 0 \times aaaaaaab) >> 33$ if $(n < 0)$: $\frac{n}{d} = (n \times 0 \times aaaaaaaa) >> 33$ Using the same processing circuitry as Example 1, above, where the processing circuitry is configured to operate on 8-bit constants, then the compiled sequence of instructions for a flooring divide operation would be:

0: MULR.C #0xab (0xab are the lowest bytes of m)
1: MLAR #0xaa
2: MLAR #0xaa
3: MLAR #0xaa
4: ASR #1

In the above instruction sequence representative of a flooring divide operation, since the lowest set of bytes of m and (m−1) differ, the MULR.C/MLAR.C instruction is utilized for instruction [0] only. Furthermore, since N+k=33, the MULR/MLAR instructions only shift the bits by 32 bits, and therefore an additional 1-bit shift is required, hence the use of ASR #1 instruction.

As described above, the use of MULR and MLAR are based on whether an accumulation is required. In this example, a first MULR instruction is performed, and then subsequent MLAR instructions are performed which accumulate the result of the previous MULR or MLAR instructions, before performing a final shift operation.

Example 3

$N$ (number of bits in $n$) = 31

$m$ (multiplier) = $0 \times d95dd300$ $(m-1) = 0 \times d95dd2ff$ $k$ (size of the divisor) = 10

$d$ (divisor) = 603

A flooring divide operation in this example, based on Equation 5 and 6 above, is represented as:

$$\text{if } (n \geq 0): \frac{n}{d} = (n \times 0 \times d95dd300) >> 41$$

$$\text{if } (n < 0): \frac{n}{d} = (n \times 0 \times d95dd2ff) >> 41$$

Using the same processing circuitry as Examples 1 and 2, above, where the processing circuitry is configured to operate on 8-bit constants, then the compiled sequence of instructions for a flooring divide operation would be:

0: MULR.C #0x00 (0x00 are the lowest bytes of m)
1: MLAR.C #0xd3
2: MLAR #0x5d
3: MLAR #0xd9
4: ASR #9

In the above instruction sequence representative of a flooring divide operation, since the lowest set of bytes of m and (m−1) differ, the MULR.C/MLAR.C instruction is utilized for instructions [0] and [1] only. Furthermore, since N+k=41, the MULR/MLAR instructions only shift the bits by 32 bits, and therefore an additional 9-bit shift is required, hence the use of ASR #9 instruction.

As described above, the use of MULR and MLAR are based on whether an accumulation is required. In this example, a first MULR instruction is performed, and then subsequent MLAR instructions are performed which accumulate the result of the previous MULR or MLAR instructions, before performing a final shift operation.

Figure 5:
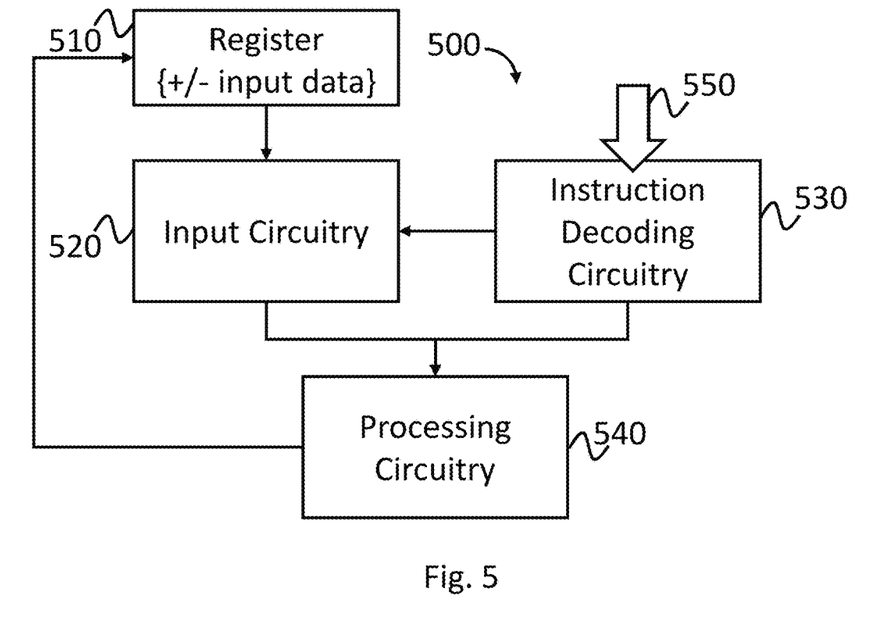
FIG. 5 is a schematic representation of an apparatus for performing multiply with right shift and/or multiply-accumulate with right shift instructions, according to an example.

FIG. 5 is a schematic representation of an apparatus 500 for performing a flooring divide operation based on multiply with right shift instructions or multiply accumulate with right shift instructions as described above in relation to method 400 of FIG. 4 and the subsequent description. The apparatus 500 has input circuitry 520 configured to obtain at least a portion of signed input data, the portion of signed input data being associated with a register 510 having a given register size. The portion of signed input data may be obtained from a storage medium (not shown) such as a solid-state drive (SSD) or other semiconductor-based RAM; a ROM, for example, a CD ROM or a semiconductor ROM; a magnetic recording medium, for example, a floppy disk or hard disk; optical memory devices in general; etc. In some examples, the register may form part of this storage medium.

The apparatus further comprises instruction decoding circuitry 530, configured to receive an instruction 550. The instruction decoding circuitry 530 may be configured to receive any number of instructions not just multiply with right shift and/or multiply-accumulate with right shift instructions for a flooring divide operation. For example, the instruction decoding circuitry 530 may be configured to receive a clipping instruction as described in further detail above. The instruction decoding circuitry 530 receives the instruction and subsequently decodes it for processing by the processing circuitry 540. The processing circuitry 540 may be configured to perform any number of tasks, and in particular, configured to perform at least the flooring divide operation. The processing circuitry 540 is configured to perform a multiply with right shift instruction or multiply-accumulate with right shift instruction on the portion of input data as is described above in relation to method 400 of FIG. 4 and the subsequent description. The processing circuitry 540 is configured to operate on constants of a given constant size smaller than the size of the register 510 from which the signed input data was obtained. The processing circuitry 540 selects a multiplier based on the sign of the signed input data obtained from the register 510, such that a first constant is selected when the sign is positive, and a second constant is selected if the sign is negative. The portion of signed input data is then multiplied by the selected multiplier and shifted by the constant's size. This processing circuitry is then configured to output the shifted multiplied input data into storage (not shown), such as the storage medium described above, and/or the register 510.

As described above, the processing circuitry 530 may be configured to operate on 8-bit constants, however, it will be appreciated that other sizes of constant may be used depending on the processing circuitry's 530 hardware. For example, the processing circuitry 530 may be configured to operate on 16-bit constants or 32-bit constants.

In addition to performing multiply with right shift instructions and/or multiply-accumulate with right shift instructions, the apparatus 500 may be configured to perform a plurality of multiply with right shift and multiply-accumulate with right shift instructions compiled as a flooring divide operation. By performing a plurality of such instructions, the apparatus 500 is able to perform flooring divide operations efficiently using values larger than the hardware configuration initially permits. This is achieved as describe above by the storing the intermediary results of the multiply with right shift and multiply-accumulate with right shift instructions in storage.

Overall Architecture

The above-described methods may be implemented on any type of suitable hardware, such as the hardware described below, and may also be used to process data of several types. For example, as explained above, the data generated during execution of a given task may be a tensor (where, as used herein, the term "tensor" is to be considered to refer to a multi-dimensional tensor). A tensor is an array of elements, such as an array of same-typed scalar elements. Various tasks may involve the processing and/or generation of tensors, such as neural network processing and graphics processing.

Figure 6:
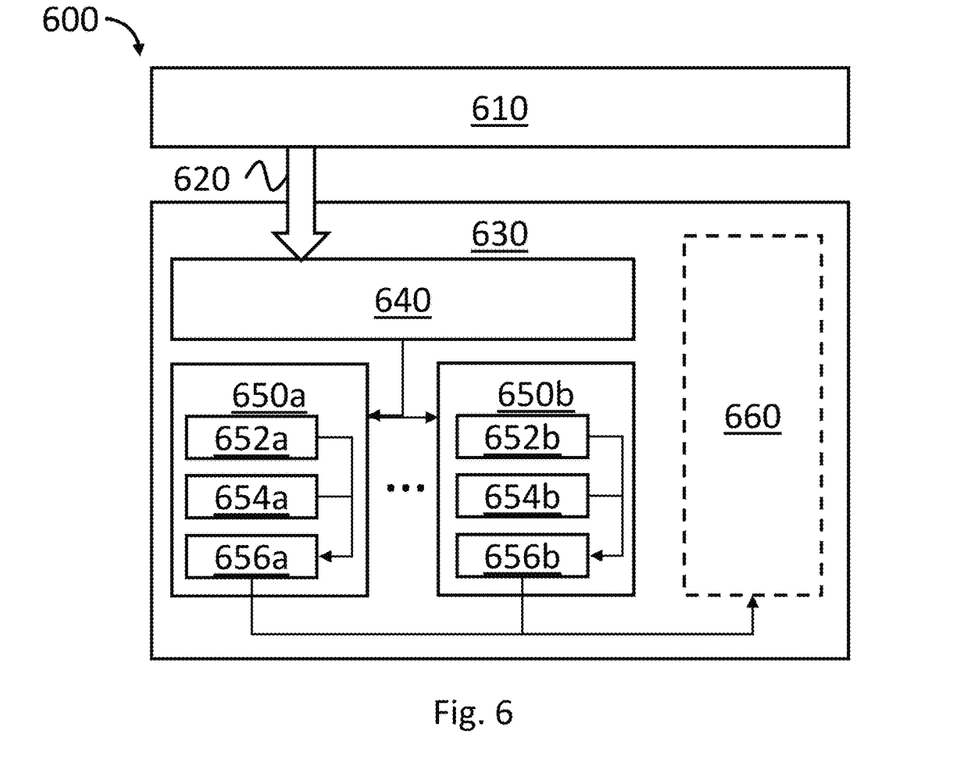
FIG. 6 is a schematic representation of a data processing system, according to an example.

The methods herein may be implemented using a processor, such as the processing circuitry 320 described above with reference to FIG. 3 and processing circuitry 520 described above with reference to FIG. 5, that provides dedicated circuitry that can be used to perform operations which would normally be undertaken by dedicated hardware accelerators, such as a neural processing unit (NPU) and a graphics processing unit (GPU). FIG. 6 shows schematically an example of a data processing system 600 including such a processor 630, which may comprise the components described above in relation to processing circuitry 320 of FIG. 3 and processing circuitry 520 of FIG. 5. It will be appreciated that the types of hardware accelerator which the processor 630 may provide dedicated circuitry for is not limited to that of an NPU or GPU but may be dedicated circuitry for any type of hardware accelerator. GPU shader cores may be well-suited for performing certain types of arithmetic operations such as neural processing operations, as these operations are generally similar to the arithmetic operations that may be required when performing graphics processing work (but on different data). Furthermore, graphics processors typically support high levels of concurrent processing (e.g., supporting large numbers of execution threads), and are optimized for data-plane (rather than control plane) processing, all of which means that graphics processors may be well-suited for performing other types of operations.

That is, rather than using entirely separate hardware accelerators, such as a machine learning processing unit that is independent of the graphics processor, such as an NPU, or only being able to perform machine learning processing operations entirely using the hardware of the GPU, dedicated circuitry may be incorporated into the GPU itself.

This means that the hardware accelerator circuitry incorporated into the GPU is operable, to utilize some of the GPU's existing resources (e.g. such that at least some functional units and resource of the GPU can effectively be shared between the different hardware accelerator circuitry, for instance), whilst still allowing an improved (more optimized) performance compared to performing all the processing with general purpose execution.

As such, the processor 630 may be a GPU that is adapted to comprise a number of dedicated hardware resources, such as those which will be described below.

In some examples, this can be particularly beneficial when performing machine learning tasks that themselves relate to graphics processing work, as in that case all of the associated processing can be (and preferably is) performed locally to the graphics processor, thus improving data locality, and (e.g.) reducing the need for external communication along the interconnect with other hardware units (e.g. an NPU). In that case, at least some of the machine learning processing work can be offloaded to the machine learning processing circuit, thereby freeing the execution unit to perform actual graphics processing operations, as desired.

In other words, in some examples, providing a machine learning processing circuit within the graphics processor, this means that the machine learning processing circuit is preferably then operable to perform at least some machine learning processing operations whilst the other functional units of the graphics processor are simultaneously performing graphics processing operations. In the situation where the machine learning processing relates to part of an overall graphics processing task this can therefore improve overall efficiency (in terms of energy efficiency, throughput, etc.) for the overall graphics processing task.

In FIG. 6, the processor 630 is arranged to receive a command stream 620 from a host processor 610, such as a CPU. The command stream comprises at least one command in a given sequence, each command to be executed, and each command may be decomposed into a number of tasks, such as the tasks discussed in examples above. These tasks may be self-contained operations, such as a given machine learning operation or a graphics processing operation. It will be appreciated that there may be other types of tasks depending on the command.

The command stream 620 is sent by the host processor 610 and is received by a command processing unit 640 which is arranged to schedule the commands within the command stream 620 in accordance with their sequence. The command processing unit 640 is arranged to schedule the commands and decompose each command in the command stream 620 into at least one task. Once the command processing unit 640 has scheduled the commands in the command stream 620, and generated a plurality of tasks for the commands, the command processing unit issues each of the plurality of tasks to at least one compute unit 650a, 650b each of which are configured to process at least one of the plurality of tasks, in the examples describe above with reference to FIGS. 1 to 5, the tasks may be the operations of the operation set 120os.

The processor 630 comprises a plurality of compute units 650a, 650b. Each compute unit 650a, 650b, may be a shader core of a GPU specifically configured to undertake a number of different types of operations, however it will be appreciated that other types of specifically configured processor may be used, such as a general-purpose processor configured with individual compute units, such as compute units 650a, 650b. Each compute unit 650a, 650b comprises a number of components, and at least a first processing module 652a, 652b for executing tasks of a first task type, and a second processing module 654a, 654b for executing tasks of a second task type, different from the first task type. In some examples, the first processing module 652a, 652b may be a processing module for processing neural processing operations, such as those which would normally be undertaken by a separate NPU. In these cases, the first processing module 652a, 652b is for example a neural engine. Similarly, the second processing module 654a, 654b may be a processing module for processing graphics processing operations forming a set of pre-defined graphics processing operations which enables the implementation of a graphics processing pipeline, which may be referred to as a graphics processor. For example, such graphics processing operations include a graphics compute shader task, a vertex shader task, a fragment shader takes, a tessellation shader task, and a geometry shader task. These graphics processing operations may all form part of a set of pre-defined operations as defined by an application programming interface, API. Examples of such APIs include Vulkan, Direct3D and Metal. Such tasks would normally be undertaken by a separate/external GPU. It will be appreciated that any number of other graphics processing operations may be capable of being processed by the second processing module.

As such, the command processing unit 640 issues tasks of a first task type to the first processing module 652a, 652b of a given compute unit 650a, 650b, and tasks of a second task type to the second processing module 654a, 354b of a given compute unit 650a, 650b. The command processing unit 640 would issue machine learning/neural processing tasks to the first processing module 652a, 652b of a given compute unit 650a, 650b where the first processing module 652a, 652b is optimized to process neural network processing tasks, for example by comprising an efficient means of managing a large number of multiply-accumulate operations. Similarly, the command processing unit 640 would issue graphics processing tasks to the second processing module 654a, 654b of a given compute unit 650a, 650b where the second processing module 652a, 654a is optimized to process such graphics processing tasks. In some examples, the first and second may both be neural processing tasks issued to a first processing module 652a, 652b, which is a neural engine. Such a neural processing task may involve the processing of a tensor, e.g., representing a feature map, with weights associated with a layer of a neural network.

In addition to comprising a first processing module 652a, 652b and a second processing module 654a, 654b, each compute unit 650a, 650b also comprises a memory in the form of a local cache 656a, 656b for use by the respective processing module 652a, 652b, 654a, 654b during the processing of tasks. The local cache may be the local memory used to hold tensor data whose coordinates are processed with reference to processing circuitry 320, 520 of FIGS. 3 and 5. Examples of such a local cache 656a, 656b is a L1 cache. The local cache 656a, 656b may, for example, a synchronous dynamic random-access memory (SDRAM) and/or a static random-access memory (SRAM). For example, the local cache 656a, 656b may comprise a double data rate synchronous dynamic random-access memory (DDR-SDRAM). It will be appreciated that the local cache 656a, 656b may comprise other types of memory.

The local cache 656a, 656b is used for storing data relating to the tasks which are being processed on a given compute unit 650a, 650b by the first processing module 652a, 652b and second processing module 654a, 654b. It may also be accessed by other processing modules (not shown) forming part of the compute unit 650a, 650b the local cache 656a, 656b is associated with. However, in some examples, it may be necessary to provide access data associated with a given task executing on a processing module of a given compute unit 650a, 650b to a task being executed on a processing module of another compute unit (not shown) of the processor 630. In such examples, the processor 630 may also comprise storage 660, for example a cache, such as an L2 cache, for providing access to data use for the processing of tasks being executed on different compute units 650a, 650b. In some examples, the storage 660 may be the registers 310, 510 or other storage medium (not shown) described above with reference to FIGS. 3 and 5.

By providing a local cache 656a, 656b tasks which have been issued to the same compute unit 650a, 650b may access data stored in the local cache 656a, 656b, regardless of whether they form part of the same command in the command stream 620. The command processing unit 640 is responsible for allocating tasks of commands to given compute units 650a, 650b such that they can most efficiently use the available resources, such as the local cache 656a, 656b, thus reducing the number of read/write transactions required to memory external to the compute units 650a, 650b, such as the storage 660 (L2 cache) or higher level memories. One such example, is that a task of one command issued to a first processing module 652a of a given compute unit 650a, may store its output in the local cache 656a such that it is accessible by a second task of a different (or the same) command issued to a given processing module 652a, 654a of the same compute unit 650a.

One or more of the command processing unit 640, the compute units 650a, 650b, and the storage 660 may be interconnected using a bus. This allows data to be transferred between the various components. The bus may be or include any suitable interface or bus. For example, an ARM® Advanced Microcontroller Bus Architecture (AMBAR) interface, such as the Advanced extensible Interface (AXI), may be used.

Figure 7:
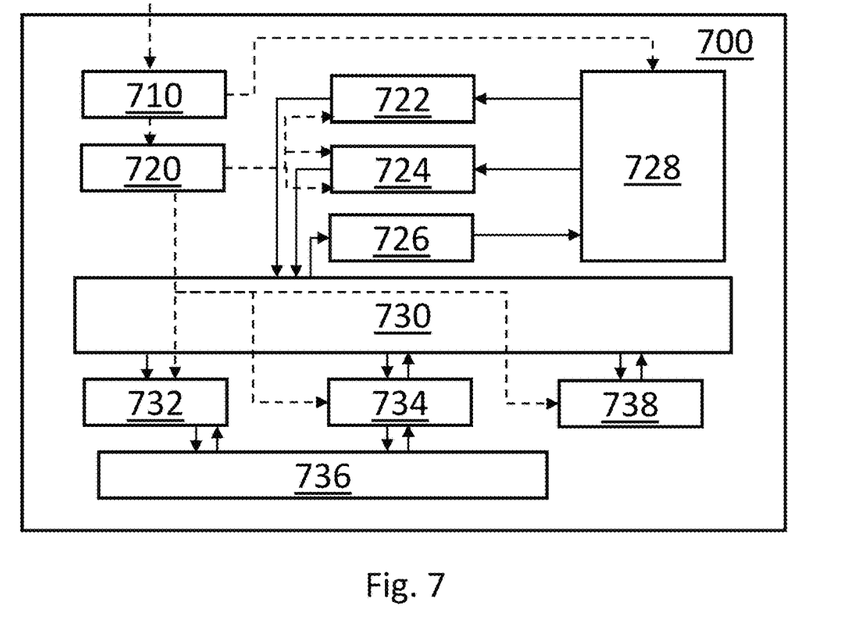
FIG. 7 is a schematic representation of a neural engine, according to an example.

FIG. 7 is a schematic diagram of a neural engine 700, which in this example is used as a first processing module 652a, 652b in a data processing system 600 in accordance with FIG. 6. The neural engine 700 includes a command and control module 710. The command and control module 710 receives tasks from the command processing unit 640 (shown in FIG. 6), and also acts as an interface to storage external to the neural engine 700 (such as a local cache 656a, 656b and/or a L2 cache 660) which is arranged to store data to be processed by the neural engine 700 such as data representing a tensor, or data representing a stripe of a tensor. The external storage may additionally store other data to configure the neural engine 700 to perform particular processing and/or data to be used by the neural engine 700 to implement the processing such as neural network weights.

The command and control module 710 interfaces to a handling unit 720, which is for example a traversal synchronization unit (TSU). In this example, each task corresponds to a stripe of a tensor, which is to be convolved with weights to implement a layer of a neural network. The tensor for example represents a feature map for processing using the neural network. A neural network typically includes a sequence of layers of processing, with an output from each layer being used as an input to the next layer. Each layer for example processes an input feature map by convolving the input feature map with a set of weights to generate an output feature map, which is used as the input feature map for the next layer. The term "feature map" is used generically herein to refer to either an input feature map or an output feature map. The processing performed by a given layer may be taken to correspond to an operation as described with reference to FIGS. 1 to 5.

In this example, the handling unit 720 splits data representing a stripe of a tensor into a plurality of blocks of data, each of which represents a respective part of the tensor. The handling unit 720 also obtains, from storage external to the neural engine 700 such as the L2 cache 660, an operation set comprising a plurality of operations. In this example, the operations are a chain of operations, representing a sequence of layers of the neural network. A block of data is allocated as an input to one of the operations by the handling unit 720.

The handling unit 720 coordinates the interaction of internal components of the neural engine 700, which include a weight fetch unit 722, an input reader 724, an output writer 726, a direct memory access (DMA) unit 728, a dot product unit (DPU) array 730, a vector engine 732, a transform unit 734, an accumulator buffer 736, and a storage 738, for processing of blocks of data. The data dependencies across the functional units are tracked by the handling unit 720. Processing is initiated by the handling unit 720 in a functional unit if all input blocks are available and space is available in the storage 738 of the neural engine 700. The storage 738 may be considered to be a shared buffer, in that various functional units of the neural engine 700 share access to the storage 738.

The weight fetch unit 722 fetches weights associated with the neural network from external storage and stores the weights in the storage 738. The input reader 724 reads data to be processed by the neural engine 700 from external storage, such as a block of data representing part of a tensor. The output writer 726 writes data obtained after processing by the neural engine 700 to external storage, such as a block of data representing part of an output feature map obtained by processing a corresponding part of an input feature map by the neural network represented by the weights fetched by the weight fetch unit 722. The weight fetch unit 722, input reader 724 and output writer 726 interface with the external storage (which is for example the local cache 656a, 656b, which may be a L1 cache such as a load/store cache) via the DMA unit 728.

The weights and block(s) of data are processed by the DPU array 730, vector engine 732 and transform unit 734 to generate output data which is written out to the external storage by the output writer 726. The DPU array 730 is arranged to efficiently calculate a dot product between two operands, such as between an array of weights and a corresponding block of data (e.g., representing part of a tensor). The vector engine 732 is arranged to perform elementwise operations, for example to apply scale parameters to scale an output of a dot product calculated by the DPU array 730. Data generated during the course of the processing performed by the DPU array 730 and the vector engine 732 is stored temporarily in the accumulator buffer 736, from where it may be retrieved by either the DPU array 730 or the vector engine 732 for further processing as desired.

The transform unit 734 is arranged to perform in-block transforms such as dimension broadcasts or axis swaps. The transform unit 734 obtains data from the storage 738 (e.g., after processing by the DPU array 730 and/or vector engine 732) and writes transformed data back to the storage 738.

To make efficient use of the storage 738 available within the neural engine 700, the handling unit 720 determines an available portion of the storage 738, which is available during execution of part of a first task (e.g. during processing of a block of data associated with the first task by the DPU array 730, vector engine 732 and/or transform unit 734). The handling unit 720 determines a mapping between at least one logical address associated with data generated during execution of a second task (e.g. by processing of a block of data associated with the second task by the DPU array 730, vector engine 732 and/or transform unit 734) and at least one physical address of the storage 738 corresponding to the available portion. The logical address is for example a global address in a global coordinate system. Hence, by altering the physical address corresponding to a given logical address, the handling unit 720 can effectively control usage of the storage 738 without requiring a change in software defining the operation to be performed, as the same logical address can still be used to refer to a given element of the tensor to be processed. The handling unit 720 identifies the at least one physical address corresponding to the at least one logical address, based on the mapping, so that data associated with the logical address is stored in the available portion. The handling unit 720 can perform the mapping process according to any of the examples herein, and may contain the clip operations and flooring divide operations to convert the tensor coordinates from logical to physical as described above in relation to FIGS. 1-5.

Figure 8:
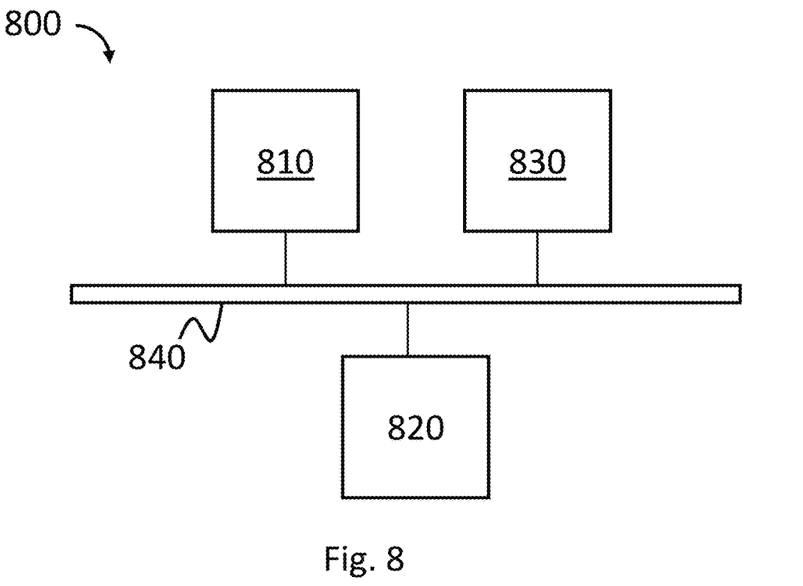
FIG. 8 is a schematic representation of a system for allocating data handling tasks, according to an example.

FIG. 8 shows schematically a system 800 for allocating data handling tasks, and in some examples generating a plurality of blocks of input data for processing.

The system 800 comprises host processor 810 such as a central processing unit, or any other type of general processing unit. The host processor 810 issues a command stream comprising a plurality of commands, each having a plurality of tasks associated therewith.

The system 800 also comprises a processor 830, which may be similar to or the same as the processor 630 of FIG. 6 and may comprise at least some of the components of and/or be configured to perform the methods described above in relation to FIGS. 1 to 5. The processor 830 comprises at least a plurality of compute units 650a, 650b and a command processing unit 640. Each compute unit may comprise a plurality of processing modules each configured to perform at least one type of operation. The system 800 may also include at least one further processor (not shown), which may be the same as the processor 830. The processor 830, and the host processor 810 may be combined as a System on Chip (SoC) or onto multiple SoCs to form one or more application processors.

The system 800 also comprises memory 820 for storing data generated by the tasks externally from the processor 830, such that other tasks operating on other processors may readily access the data. However, it will be appreciated that the external memory usage will be used sparingly, due to the allocation of tasks as described above, such that tasks requiring the use of data generated by other tasks, or requiring the same data as other tasks, will be allocated to the same compute unit 650a, 650b of a processor 830 so as to maximize the usage of the local cache 656a, 656b.

In some examples, the system 800 may comprise a memory controller (not shown), which may be a dynamic memory controller (DMC). The memory controller is coupled to the memory 820. The memory controller is configured to manage the flow of data going to and from the memory. The memory may comprise a main memory, otherwise referred to as a 'primary memory.' The memory may be an external memory, in that the memory is external to the system 800. For example, the memory 820 may comprise 'off-chip' memory. The memory may have a greater storage capacity than local caches of the processor 830 and/or the host processor 810. In some examples, the memory 820 is comprised in the system 800. For example, the memory 820 may comprise 'on-chip' memory. The memory 820 may, for example, comprise a magnetic or optical disk and disk drive or a solid-state drive (SSD). In some examples, the memory 820 comprises a synchronous dynamic random-access memory (SDRAM). For example, the memory 820 may comprise a double data rate synchronous dynamic random-access memory (DDR-SDRAM).

One or more of the host processors 810, the processor 830, and the memory 820 may be interconnected using a system bus 840. This allows data to be transferred between the various components. The system bus 840 may be or include any suitable interface or bus. For example, an ARM® Advanced Microcontroller Bus Architecture (AMBAR) interface, such as the Advanced extensible Interface (AXI), may be used.

Figure 9:
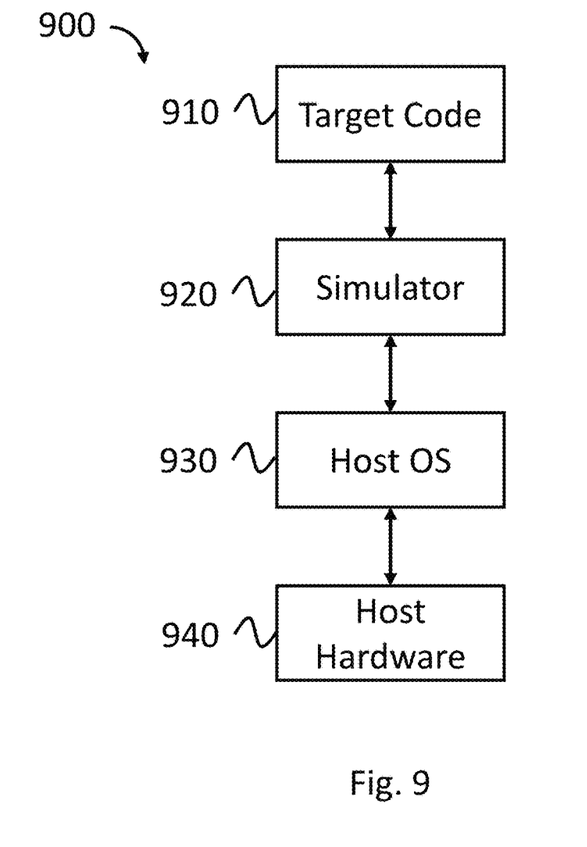
FIG. 9 is a schematic representation of a simulator implementation according to an example.

FIG. 9 illustrates a simulator implementation 900 that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 940, optionally running a host operating system 930, supporting the simulator program 920. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware or provide an instruction execution environment typically associated with a different hardware architecture. An overview of simulation is given in "Some Efficient Architecture Simulation Techniques," Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 940), some simulated embodiments may make use of the host hardware, where suitable.

The simulator program 920 may be stored on a computer-readable storage medium (which may be a non-transitory medium), and provides a program interface (instruction execution environment) to the target code 910 which is the same as the application program interface of the hardware architecture being modelled by the simulator program 920. Thus, the pro. m instructions of the target code 910, including the control of memory accesses based on the realm protection functionality described above, may be executed from within the instruction execution environment using the simulator program 920, so that a host computer 940 which does not actually have the hardware features of the apparatus shown in FIGS. 3 and 5, discussed above but can emulate these features.

At least some aspects of the examples described herein, with reference to FIGS. 1-9, comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above examples are to be understood as illustrative examples of the disclosure. Further examples of the disclosure are envisaged. It is to be understood that any feature described in relation to any one example may be used alone, or in combination with other features described, and may also be used in combination with one or more features of any other of the example, or any combination of any other of the examples. Furthermore, equivalents and modifications not described above may also be employed without departing from the scope of the disclosure, which is defined in the accompanying claims.

The invention claimed is:

1. A method of performing a partial clip instruction with a portion of a clip value, the method comprising:
   decoding the partial clip instruction using instruction decoding circuitry;
   obtaining at least a portion of input data, the portion of input data being associated with a register having a register size; and
   in response to the decoded instruction:
      clipping the portion of the input data based on the portion of the clip value; and
      setting a flag indicating further clipping is required when an upper value of the portion of input data is equal to or exceeds the portion of the clip value.

2. The method of performing a partial clip instruction with a portion of a clip value according to claim 1, further comprising decoding an input portion number associated with the portion of input data to determine a selected input portion and a selected clip portion associated with the clip value.

3. The method of performing a partial clip instruction with a portion of a clip value according to claim 1, further comprising reading the flag value and determining whether to clip the portion of the input data based on the flag value.

4. The method of performing a partial clip instruction with a portion of a clip value according to claim 1, wherein clipping the portion of the input data comprises determining whether the portion of the input data is greater than the portion of the clip value.

5. The method of performing a partial clip instruction with a portion of a clip value according to claim 1, wherein the portion of the clip value is an 8-bit shifted constant.

6. The method of performing a partial clip instruction with a portion of a clip value according to claim 1, wherein the register comprises at least a low bound component and a high bound component, and the flag is stored in the low bound component.

7. The method of performing a partial clip instruction with a portion of a clip value according to claim 6, wherein the flag is stored in a sign bit associated with the low bound of the register.

8. A method of performing a clipping operation, the method comprising performing a plurality of partial clip instructions of claim 1, wherein performing subsequent partial clip instructions is based on the setting of the flag.

9. The method of performing a clipping operation according to claim 8, wherein performing at least one of the subsequent partial clip instructions of the plurality of partial clip instructions comprises reading the flag.

10. A method of compiling a clipping operation, the method comprising compiling a sequence of instructions comprising a plurality of partial clip instructions according to claim 1, wherein the sequence length is determined based on a range of potential input values.

11. The method of compiling a clipping operation according to claim 10, wherein a first of the plurality of partial clip instructions does not require data associated with the flag, and wherein at least a second of the plurality of partial clip instructions comprises reading the flag.

12. An apparatus for performing a partial clip instruction with a portion of a clip value, the apparatus comprising:
   instruction decoding circuitry to decode the partial clip instruction;
   input circuitry to obtain at least a portion of input data, the portion of input data being associated with a register having a register size; and
   processing circuitry to perform data processing on the portion of the input data in response to the partial clip instruction decoded by the instruction decoding circuitry, wherein the processing circuitry is configured to operate on the portion of the input data, the programming circuitry is to:
      clip the portion of the input data based on the portion of the clip value; and
      set a flag indicating further clipping is required when an upper value of the portion of the input data is equal to or exceeds the portion of the clip value.

13. The apparatus for performing a partial clip instruction with a portion of a clip value according to claim 12, wherein the processing circuitry is further to decode an input portion number associated with the portion of input data to determine a selected input portion and a selected clip portion associated with the clip value.

14. The apparatus for performing a partial clip instruction with a portion of a clip value according to claim 12, wherein the processing circuitry is to clip the portion of the input data comprises based on whether the portion of the input data is greater than the portion of the clip value.

15. The apparatus for performing a partial clip instruction with a portion of a clip value according to claim 12, wherein the portion of the clip value is an 8-bit shifted constant.

16. The apparatus for performing a partial clip instruction with a portion of a clip value according to claim 12, wherein the register comprises at least a low bound component and a high bound component, and wherein the flag is stored in the low bound component.

17. The apparatus for performing a partial clip instruction with a portion of a clip value according to claim 16, wherein the flag is stored in a sign bit associated with the low bound of the register.

18. An apparatus for performing a clip operation, the apparatus comprising a compilation module for compiling a sequence of instructions comprising a plurality of partial clip instructions, wherein at least one of the partial clip instructions is performed by the apparatus of claim 12.

19. A non-transitory computer-readable storage medium comprising a set of computer-readable instructions stored thereon, which when executed by at least one processor causes the at last one processor to control a host data processing operation to provide an instruction execution environment for executing instructions of target code, the computer program comprising:

decoding the clip instruction using instruction decoding circuitry;

obtaining at least a portion of input data, the portion of input data being associated with a register having a register size; and in response to the decoded instruction:
clipping the portion of the input data based on the portion of the clip value; and
setting a flag indicating further clipping is required when an upper value of the portion of input data is equal to or exceeds the portion of the clip value.

20. A computer program for controlling host data processing apparatus to provide an instruction execution environment comprising:

instruction decoding circuitry to decode the partial clip instruction;

input circuitry to obtain at least a portion of input data, the portion of input data being associated with a register having a register size; and processing circuitry to perform data processing on the portion of the input data in response to the partial clip instruction decoded by the instruction decoding circuitry, wherein the processing circuitry is configured to operate on the portion of the input data, the programming circuitry is to:

clip the portion of the input data based on the portion of the clip value; and set a flag indicating further clipping is required when an upper value of the portion of the input data is equal to or exceeds the portion of the clip value.

* * * * *